Sept. 19, 1939.   W. R. URQUHART ET AL   2,173,738
TIRE BALANCING APPARATUS
Filed May 25, 1935   3 Sheets-Sheet 3
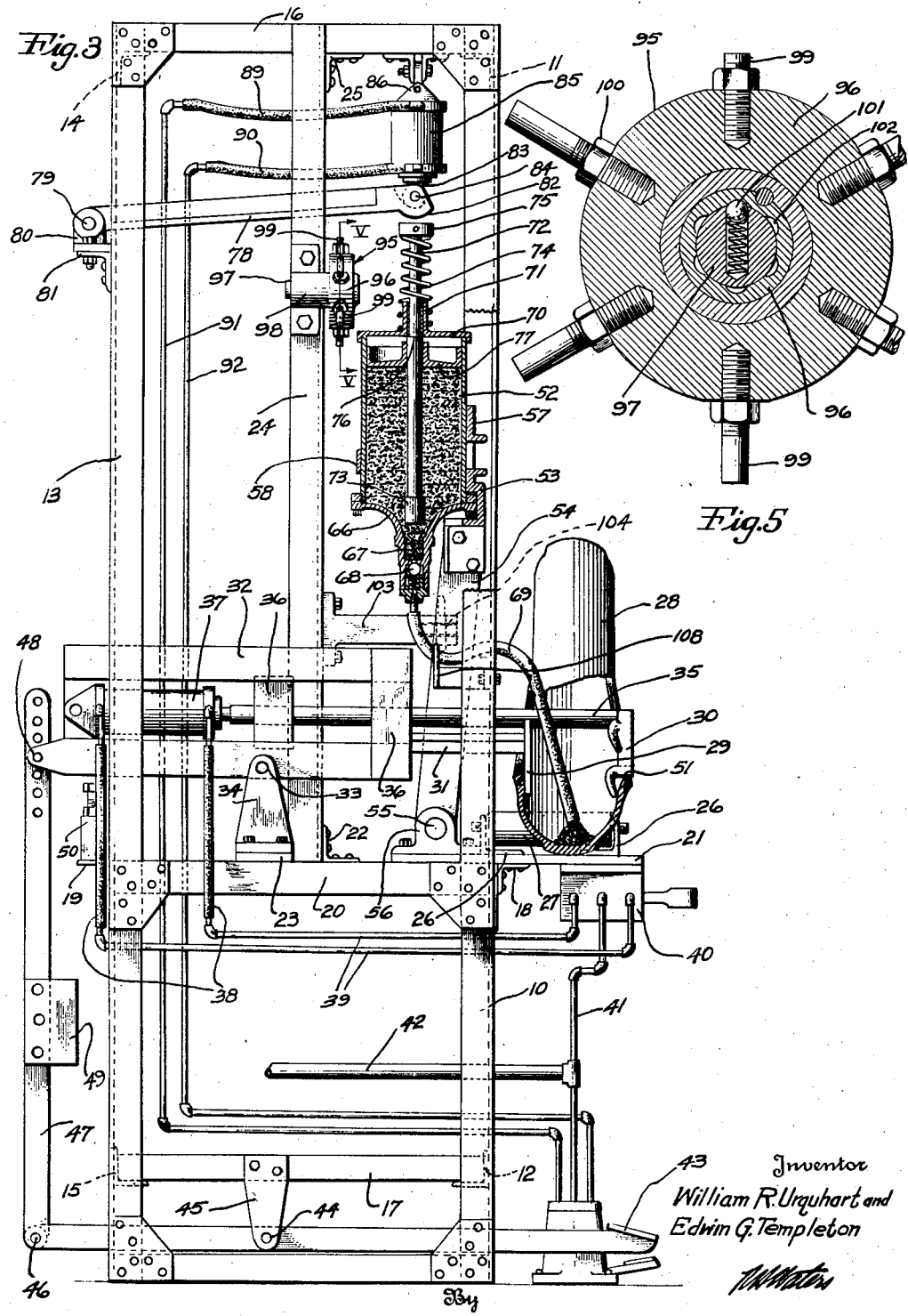
Inventor
William R. Urquhart and
Edwin G. Templeton
Attorney Patented Sept. 19, 1939

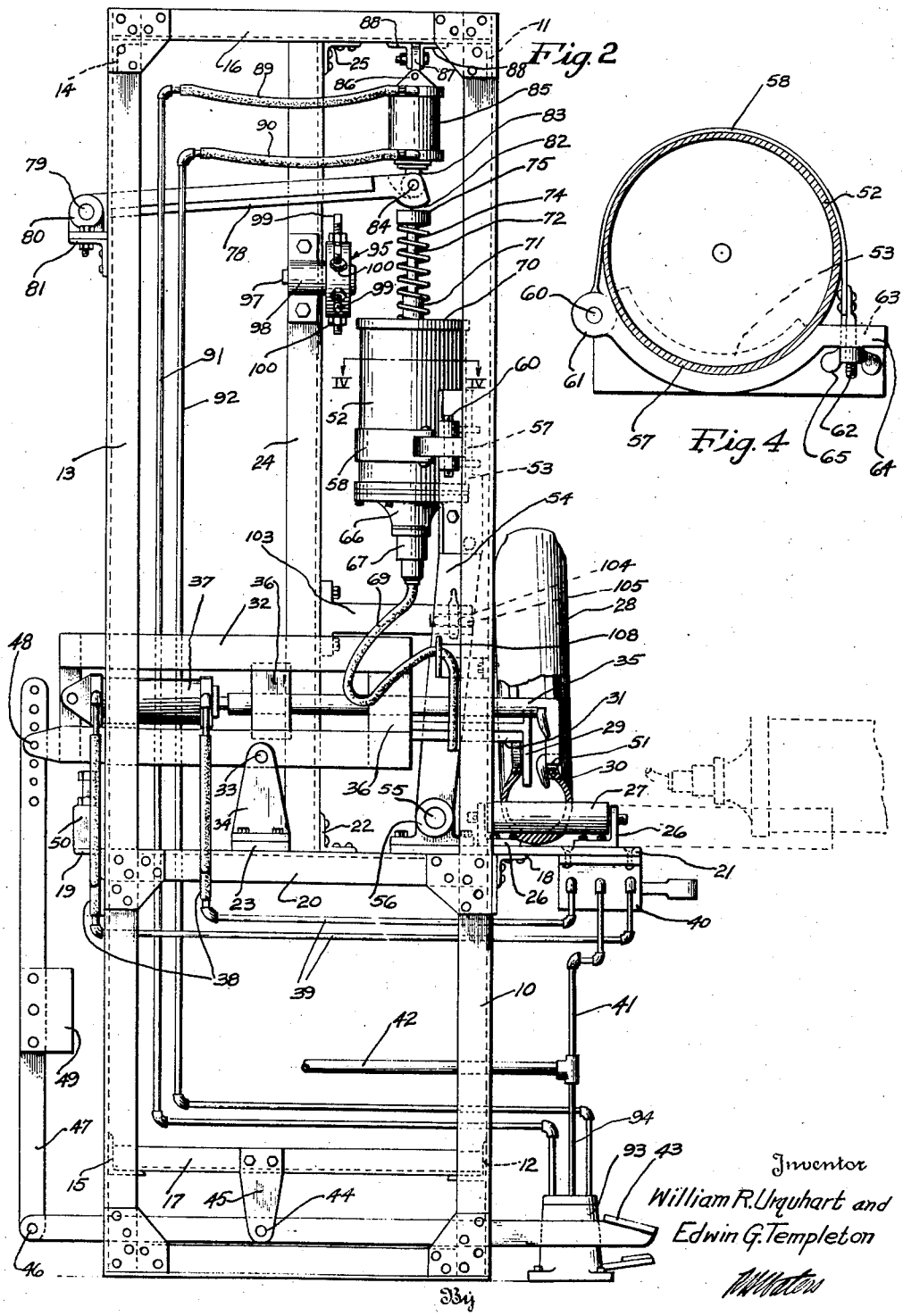

2,173,738

UNITED STATES PATENT OFFICE 2,173,738

TIRE BALANCING APPARATUS

William R. Urquhart and Edwin G. Templeton, Akron, Ohio, assignors to Wingfoot Corporation, Wilmington, Del., a corporation of Delaware Application May 25, 1935, Serial No. 23,410

13 Claims. (Cl. 91—43)

The present invention relates to apparatus for balancing tire casings and it has particular reference to apparatus for applying to the interior of the casings a plastic balancing composition, such as that disclosed in the application of Allan L. MacCracken, Serial No. 10,234, and assigned to Wingfoot Corporation.

One of the objects of the present invention is to provide an apparatus of the character described, by means of which a quantity of plastic tire-balancing material of predetermined weight may quickly and easily be deposited within a tire casing for distribution by the operator over the walls thereof.

Another object of the invention is to provide an apparatus, by means of which the quantity of balancing material extruded thereby may be selectively controlled in accordance with the amount that the casing is out of balance.

A further object of the invention is to provide an apparatus in which the cylinder containing the relatively heavy balancing material may be removed therefrom to replenish the supply and replaced therein with a minimum of effort.

With such objects in view, as well as other advantages which may be incident to the use of the improvements, the invention consists in the several parts and combinations thereof, hereinafter set forth and claimed, with the understanding that the several necessary elements constituting the same may be varied in proportions and arrangement without departing from the nature and scope of the invention as defined in the appended claims.

In order to make the invention more clearly understood there are shown in the accompanying drawings, means for carrying the invention into practical effect, without limiting the improvements in their useful application to the particular constructions which, for the purpose of explanation, have been made the subject of illustration.

In the accompanying drawings:

Fig. 2 is a side elevation of the structure shown in Fig. 1 and with the casing spreading jaws in their closed position;

Fig. 3 is a view partly in side elevation and partly in vertical section and illustrating a tire casing with the side walls thereof spread apart for the application of the balancing material;

Fig. 4 is an enlarged transverse sectional view taken on line IV—IV of Fig. 2; and Fig. 5 is an enlarged transverse sectional view taken on line V—V of Fig. 3.

Figure 1:
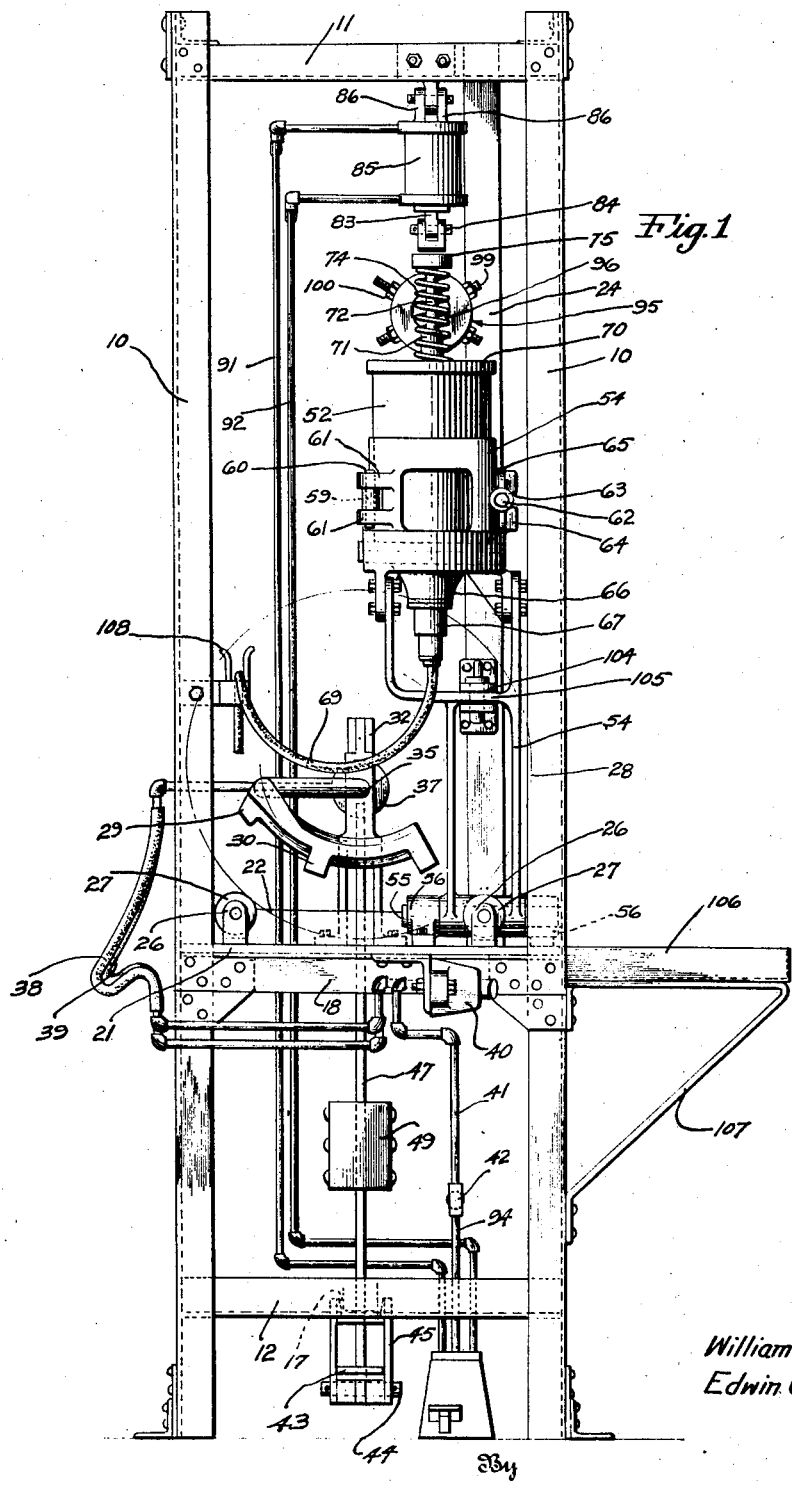
Fig. 1 is a front elevation of an apparatus constructed in accordance with the invention.

Referring to the drawings, an apparatus constructed in accordance with the present invention is shown as comprising a pair of front, vertically extending uprights 10, preferably of angle construction, which are tied together adjacent to their upper and lower ends by transversely extending angle bars 11 and 12, respectively, and a pair of rear vertically extending uprights 13, also of angle construction which are tied together at their upper and lower ends by angle bars 14 and 15. The front and rear uprights 10 and 13 are also tied together adjacent to their upper ends by rearwardly extending bars 16 and adjacent to their lower ends by a single rearwardly extending channel bar 17 secured to the lower bars 12 and 15 intermediate their ends. Laterally extending angle bars 18 and 19 and rearwardly extending angle bars 20 connect the uprights 10 and 11 at the front and rear of the apparatus and at each side thereof and constitute the support for a forwardly extending table 21, a transversely extending angle bar 22 and a plate 23 disposed parallel thereto. An upright 24, also of angle construction, is secured at its upper end to a transversely extending angle bar 25 fixed to the bars 16 and at its lower end to the bar 22.

Journaled in bearings 26 mounted on the table 21 is a pair of rollers 27 which are adapted to rotatably support a tire casing to be balanced, indicated generally at 28. When a tire casing is positioned on the rollers 27, it may be rotated thereon until the light side of a casing, which is generally indicated by a suitable mark, is lowermost and then rested against the forward uprights 10 (Fig. 2). The side walls of the lower portion of the tire casing are then spread by means of a pair of jaw members 29 and 30 so as to facilitate the application of the balancing material upon the interior of the casing. The jaw member 29 is carried by an arm 31 fixed to a frame 32 which is pivotally mounted by means of a pin 33 for vertical swinging movement on a bracket 34 carried by the plate 23. The other jaw member 30 is fixed to the outer end of a piston rod 35 which is mounted for horizontal reciprocation in slide bearing blocks 36 carried by the frame 32. This rod is reciprocated by means of a cylinder and piston device 37 also carried by the frame 32 and which is supplied with fluid under pressure, such as compressed air, through flexible pipes 38. These pipes communicate with rigid pipes 39, which in turn communicate with a three-way valve 40 located beneath the table 21. Fluid under pressure is supplied to the valve 40 through a pipe 41 leading to a main pressure supply pipe 42.

The frame 32 is rocked about its pivot 33 so as to insert the jaw members 29 and 30 between the side walls of the tire casing as shown in Fig. 2, by means of a treadle 43 which is pivotally mounted, as at 44, upon a depending bracket 45 carried by the channel bar 17. This treadle is pivotally connected at its rear extremity, as at 46, with the lower end of a vertically extending link 47, which is in turn pivotally connected at its upper end for vertical adjustment with the rear end of the frame 32 by a pin 48. A weight 49 is fixed to the link 47 so as to normally urge the parts toward a position in which the jaw members 29 and 30 are elevated. An adjustable stop 50 is mounted on the angle bar 19 to limit the amount that the frame 32 may swing under the influence of the weight 49.

A tire casing having been positioned properly upon the table 21, the operator first depresses the treadle 43, thus lowering the jaw members 29 and 30 against the action of the weight 49, until their downward movement is arrested by the engagement of the bead of the casing by a shoulder 51 provided on the movable jaw member 30. The operator then actuates the valve 40 to admit air under pressure to the rear end of the fluid pressure cylinder 37, thus projecting the movable jaw member 30 forwardly so as to flex apart the walls of the casing, as shown in Fig. 3. The engagement of the jaw members 29 and 30 with the casing, together with the fact that the parts now occupy positions in which they overbalance the weight 49, renders it possible for the operator to release the treadle 43, thus facilitating his further operations.

The casing 28 is now ready to have the plastic balancing compound applied to the interior thereof, such compound preferably comprising self-vulcanizing rubber cement mixed with barytes or lead dust. This is accomplished by means of the following described mechanism.

A cylinder 52 containing a supply of suitable plastic balancing compound is removably mounted upon a seat 53 (Figures 3 and 4) secured to the upper end of a vertically extending support 54, which is mounted for swinging movement about a shaft 55 fixed in bearings 56 carried by the table 21. The forward edge of the seat 53 is formed with an upwardly extending arcuate portion 57, against which the cylinder 52 is removably clamped by means of a flexible strap 58. One end of this strap is formed with an eye 59 for engagement with a pin 60 mounted in ears 61 formed on the arcuate portion 57 of the seat 53. The other end of the strap 58 is provided with a bolt 62, which projects forwardly through an open-end 63 provided in a vertical flange 64, formed on the arcuate portion 57 of the seat 53 for engagement by a wing nut 65 (Fig. 4).

The lower end of the cylinder 52 is closed by a head 66 of substantially funnel shape and having a well 67 of relatively small diameter at its lower end, which communicates through a ball check valve 68 with a flexible pipe 69. The upper end of the cylinder 52 is closed by a head 70 formed with an axially disposed bearing sleeve 71, within which a rod 72 is mounted for vertical sliding movement. A piston 73 is fixed to the lower end of this rod and is adapted to enter the well 67, when the rod 72 is moved downwardly and force therefrom and from the flexible pipe 69 a predetermined quantity of the balancing material, as will presently be described. The rod 72 and piston 73 carried thereby are normally maintained in an elevated position by means of a coil spring 74, which surrounds the rod 72 between the sleeve 71 and a collar 75 fixed to the upper end of the rod 72. A shoulder 76 formed on the rod 72 limits the upward movement of the rod through engagement with the cylinder head 70. Located within the cylinder 52 and slidably mounted on the rod 72 is a follower plate 77, which closely engages the walls of the cylinders in the manner of a piston, so as to rest directly upon the surface of the plastic material and provide a weight for forcing the material downwardly and into the well 67 as the supply therein is ejected.

The rod 72 and piston 73 are at times forced downwardly against the action of the spring 74 through the medium of an arm 78, which is pivotally mounted as at 79 between ears 80 mounted on an angle bar 81 carried by the rear uprights 13. The forward end of the arm 78 is curved, as indicated at 82, for sliding engagement with the collar 75 and is also bifurcated to receive the lower end of a piston rod 83 to which it is pivotally connected by a pin 84. The rod 83 extends upwardly and into a fluid pressure cylinder 85, which is provided with ears 86 on its upper cylinder head for pivotal engagement with an eye 87 fixed between a pair of angle bars 88 carried by the upper side frame member 16. The hereinabove-described manner of mounting the several parts compensates for the lost motion between the rectilinear movement of the piston rods 72 and 83 and the arcuate movement of the arm 78.

Fluid pressure is admitted to and permitted to escape from the upper and lower ends of the cylinder 85 through flexible pipes 89 and 90, respectively, which communicate with rigid pipes 91 and 92. These pipes lead to a treadle-operated, three-way valve 93 which communicates with a main supply pipe 42 through a branch pipe 94.

The downward movement of the arm 78 and the resulting downward movement of the rod 72 and piston 73 is adjustably limited by a star wheel 95, comprising a hub 96 rotatably mounted upon the stud shaft 97 fixed in a bearing 98 carried by the upright 24. A plurality of radially extending stop pins 99 are threaded into the hub 96 for radial adjustment and are maintained in the desired adjusted position by means of lock nuts 100. The star wheel 95 is also maintained in the desired rotary-adjusted position with a selected stop pin 99 uppermost, and in the path of movement of the arm 78 by means of a spring-biased ball detent 101 carried by the shaft 97 for engagement with recesses 102 provided in the hub 96. It will be apparent that by rotating the star wheel 95 to a position in which a stop pin 99 of minimum length is uppermost (Fig. 5), the arm 78 will swing through its maximum arc and as a result the greatest amount of balancing material will be extruded from the pipe 69. Conversely, if the star wheel 95 is rotated to a position in which a pin 99 of maximum length is uppermost, the movement of the lever 78 will be limited to its minimum arc so as to extrude the least amount of material from the tube 69.

When it is desired to extrude a quantity of material of predetermined weight from the pipe 69 the star wheel 95 is rotated to a position where a stop pin 99, corresponding in length to such weight, is uppermost. The treadle-operated valve 93 is then actuated so as to admit air under pressure into the upper portion of the cylinder 85 so as to depress the piston rod 83, arm 78 and piston rod 72 against the action of the spring 74, thus causing the piston 73 to enter the well 67 and force the balancing material or a portion thereof contained therein through the flexible pipe 69 and into the tire casing. This movement of the parts continues until the arm 78 engages the selected stop pin 99 and is arrested thereby. The material thus deposited in the casing is then distributed by the operator over the interior of the light side of the casing by a suitable tool, after which it is dusted with powdered soapstone or the like.

The balancing operation now being completed, the operator admits air under pressure into the lower portion of cylinder 85, thus elevating the piston rod 83 and arm 78, the spring 74 raising the rod 72 and piston 73. The follower plate 77 will then force a fresh supply of balancing material into the well 67 for the succeeding operation. The operator next actuates the valve 40 so as to release the air within the rear portion of the cylinder 37 and to admit air under pressure into the forward portion thereof. This causes the piston rod 35 and jaw member 30 carried thereby to recede to their initial position where the frame 32 being once more overbalanced, swings the jaw members 29 and 30 upward automatically under the action of the weight 49. The casing 28 may now be removed from the apparatus, with the mechanism in position for the succeeding balancing operation.

The cylinder 52 and parts carried thereby are locked in the operative positions shown and described by means of a forwardly extending arm 103, which is carried by the upright 24 and which is provided with a slot and pin connection 104 at its outer end adapted to releasably engage a web 105 formed on the swinging support 54. The cylinder may be removed from the apparatus for recharging and cleaning when the supply of balancing material becomes exhausted, or for replacement by another freshly charged cylinder, by first releasing the slot and pin connection 104 and swinging the support 54 and cylinder 52 carried thereby forwardly and downwardly to the position shown by the dotted lines in Fig. 2, in which position the support 54 rests upon the table 21. The wing nut 65 is then loosened and the strap 54 removed from engagement with the cylinder 52, after which the latter may be lifted from its seat 53 for the purposes described.

If desired the apparatus may be provided with a table 106 at one side thereof which is carried by bracket members 107 secured to the front and rear uprights 10 and 13, respectively, and which may be utilized to support scales employed in testing from time to time the weight of the material extruded from the pipe 69, or other tools or appurtenances. Also, a rack 108 may be secured to one of the uprights 10 for supporting the flexible pipe 69 when not in use.

From the foregoing it will be apparent that a relatively simple apparatus is provided, by means of which a quantity of tire-balancing material of predetermined weight may quickly and easily be deposited within a tire casing, and in which the amount of material so deposited may be varied in accordance with the amount a tire may be overbalanced. Also, it will be apparent that an apparatus is provided in which the cylinder containing the relatively heavy balancing material may be mounted in or removed from the apparatus with a minimum of effort.

In carrying out the invention various modifications and changes in the proportion and arrangement of the several parts may be made by those skilled in the art, without departing from the nature and scope of the invention as defined in the appended claims.

Having thus described the invention, what we claim is:

1. Apparatus for balancing tire casings comprising a frame mounted for vertical swinging movement, a pair of tire-spreading members carried by said frame, said frame being unbalanced with the lesser force operating on the member-carrying side of said frame so as to maintain said members in an elevated position, means for swinging said frame vertically against the action of gravity to position said members between the side walls of a tire casing adjacent to the light side of said casing, means carried by said frame for effecting relative movement between said members in a horizontal direction to separate said side walls so as to provide access to the interior of said casing, and means for measuring and selectively applying any of a plurality of predetermined quantities of a weighting material in a fluid condition upon the interior surface of said casing.

2. Apparatus for balancing tire casings comprising a frame, a pair of tire-spreading members carried by said frame, one of said members being fixed to said frame and the other of said members being movably mounted on said frame, manually operable means for moving said frame vertically against the action of gravity to position said members between the side walls of a tire casing adjacent to the light side of said casing, fluid pressure means carried by said frame for moving said movable member in a horizontal direction to separate said side walls so as to provide access to the interior of said casing, and means for measuring and selectively applying any of a plurality of predetermined quantities of a weighting material in a fluid condition upon the interior surface of said casing.

3. Apparatus for balancing tire casings comprising a frame, a pair of members carried by said frame, means for moving said frame vertically against the action of gravity to position said members between the side walls of a tire casing adjacent to the light side of said casing, means carried by said frame for effecting relative movement between said members in a horizontal direction to separate said side walls so as to provide access to the interior of said casing, and means for measuring and selectively applying any of a plurality of predetermined quantities of a weighting material in a fluid condition upon the interior surface of said casing, said last-mentioned means including a flexible conduit adapted to be manipulated to distribute said material on said surface.

4. Apparatus for balancing tire casings comprising a pair of spreading members, means for inserting said members between the side walls of a tire casing adjacent to the light side of said casing, means for moving said members apart to separate said side walls so as to provide access to the interior of said casing, a cylinder for containing a supply of weighting material in a fluid condition and having an outlet therefrom, a piston in said cylinder for extruding said material through said orifice and depositing the same upon the interior surface of said casing, means for actuating said piston, an abutment operatively connected with said piston, and a series of stops adapted to be selectively moved into the path of movement of said abutment to limit the stroke of said piston, thus to control the quantity of material extruded through said outlet.

5. Apparatus for balancing tire casings comprising means for separating the side walls of a tire adjacent the portion at which the balancing material is to be applied, means for supplying weighting material in any of several predetermined quantities to said tire, means for selecting the predetermined quantity of material desired, and manually actuated power means operable to discharge all of and only the selected quantity of material to the tire upon actuation thereof.

6. In a tire-balancing machine, means for supplying a weighting material to the tire to be balanced and means for spreading the tire at the place where the material is to be applied to the inside thereof, comprising a pivoted member, relatively movable spreader members carried by said arm, means for actuating said spreader members, said pivoted member being so balanced as to normally raise said spreader members out of operative position, means for instigating the action of said spreader member operating means, and means for moving said pivoted member to a position where said spreader members are in position to spread the side walls of said tire away from each other, said spreader members being so arranged on said pivoted member that when the same are in operative relation spreading the side walls of the tire the balance on the pivot for said pivoted member is such as to hold said pivoted member with the spreader members in operative position without the aid of the means normally used for initially placing the spreader members between the side walls of the tire.

7. In a device for balancing tires, the combination with a tire support of a removable cylinder for supplying weighting material to the tire, a piston within said cylinder for moving material out of said cylinder, said piston having an exposed end externally of said cylinder to permit actuation thereof from outside of said cylinder, means adapted to actuate said piston different predetermined amounts when said cylinder and piston are in operative position, said piston being non-positively connected with the actuating means therefor, whereby said piston and cylinder may be removed and replaced without removing the actuating means therefor, whereby different cylinders of weighting material can be supplied to the machine in operative position to be actuated by the actuating mechanism for the piston without disturbing the actuating mechanism.

8. Apparatus for balancing tire casings comprising means for separating the side walls of a tire casing to provide access to the interior of said casing, a receptacle for containing a supply of weighting material in a fluid condition and having an outlet therefrom, and fluid pressure means for measuring and selectively applying any of a plurality of predetermined quantities of said material through said outlet and depositing the same upon the desired portion of the interior surface of said casing.

9. Apparatus for balancing tire casings comprising means for separating the side walls of a tire casing to provide access to the interior of said casing, a cylinder for containing a supply of weighting material in a fluid condition and having an outlet therefrom, a piston in said cylinder for measuring and selectively applying any of a plurality of predetermined quantities of said material through said outlet and depositing the same upon the desired portion of the interior surface of said casing, and means for actuating said piston predetermined selectable amounts.

10. Apparatus for balancing tire casings comprising means for separating the side walls of a tire casing to provide access to the interior of said casing, a cylinder for containing a supply of weighting material in a fluid condition and having an outlet therefrom, a piston in said cylinder for extruding any of a plurality of predetermined quantities of said material through said outlet and depositing the same upon the desired portion of the interior surface of said casing, means for actuating said piston, an abutment operatively connected with said actuating means, and a series of stops adapted to be selectively moved into the path of movement of said abutment to limit the stroke of said actuating means and thus of said piston, to control the quantity of material extruded through said outlet.

11. Apparatus for balancing tire casings comprising a tire support, means for spreading the tire walls, a cylinder for containing a supply of weighting material in a fluid condition and having an outlet therefrom, a piston in said cylinder for extruding a predetermined selected quantity of said material through said outlet and depositing the same upon the interior surface of said casing, means for actuating said piston, and means for selectively limiting the stroke of said piston, thus to control the quantity of material extruded through said outlet.

12. Apparatus for balancing tire casings comprising a tire support, means for spreading the tire walls, a cylinder for containing a supply of weighting material in a fluid condition and having an outlet therefrom therein, a piston in said cylinder for extruding said material through said outlet and depositing the same upon the interior surface of said casing, means for actuating said piston, an abutment operatively connected with said piston, and a series of stops adapted to be selectively moved into the path of movement of said abutment to limit the stroke of said piston to various degrees, thus to control the quantity of material extruded through said outlet.

13. In a device of the class described, the combination with a tire support, vertically movable tire-spreading means, gravity-actuated means normally urging said tire-spreading means upwardly into an inoperative position, and manual means for moving said tire-spreading means downwardly into operative tire-spreading position, the distribution of the weight of said tire-spreading means in tire-spreading position being such as to counteract the effect of said gravity-actuated means.

WILLIAM R. URQUHART.
EDWIN G. TEMPLETON.